United States Patent
Nahill et al.

(10) Patent No.: US 7,138,082 B2
(45) Date of Patent: Nov. 21, 2006

(54) SWAGE-FORMING OF CONTAINER THREADS

(75) Inventors: Thomas E. Nahill, Amherst, NH (US);
Keith J. Barker, Candia, NH (US);
Brian A. Lynch, Merrimack, NH (US);
Bassam M. Kalmouni, Pembroke, NH (US)

(73) Assignee: Graham Packaging Pet Technologies Inc., York, PA (US)

( * ) Notice: Subject to any disclaimer, the term of this patent is extended or adjusted under 35 U.S.C. 154(b) by 268 days.

(21) Appl. No.: 10/329,666

(22) Filed: Dec. 24, 2002

(65) Prior Publication Data

US 2004/0121097 A1   Jun. 24, 2004

(51) Int. Cl.
*B29C 49/00* (2006.01)
(52) U.S. Cl. ............ 264/533; 264/534; 264/536
(58) Field of Classification Search .......... 264/533, 264/536, 534
See application file for complete search history.

(56) References Cited

U.S. PATENT DOCUMENTS

| | | |
|---|---|---|
| 3,247,548 A | 4/1966 | Fields et al. |
| 3,303,249 A | 2/1967 | Strauss |
| 3,597,793 A | 8/1971 | Weiler et al. |
| 3,618,170 A | 11/1971 | Owens |
| 3,649,150 A | 3/1972 | Gilbert |
| 3,695,805 A | 10/1972 | Gilbert |
| 4,061,702 A | 12/1977 | Kessler |
| 4,115,496 A | 9/1978 | Krall |
| 4,305,704 A | 12/1981 | Lemelson |
| 4,397,629 A | 8/1983 | Akutsu |
| 4,412,966 A | 11/1983 | Yoshino et al. |
| 4,578,028 A | 3/1986 | Dirksing et al. |
| 4,753,591 A | 6/1988 | Maes et al. |
| 4,929,410 A | 5/1990 | Meyer et al. |
| 4,941,815 A | 7/1990 | Julian |

(Continued)

FOREIGN PATENT DOCUMENTS

DE   1299406   7/1969

(Continued)

OTHER PUBLICATIONS

U.S. Appl. No. 10/329,666, filed Dec. 24, 2002, Naill et al.

*Primary Examiner*—Suzanne E. McDowell
(74) *Attorney, Agent, or Firm*—Rissman Jobse Hendricks & Oliverio LLP

(57) ABSTRACT

A method of making a plastic container having a threaded wide-mouth finish includes providing a preform having at least an exterior surface of molded polyester construction. The preform is placed in a mold cavity having a first portion for forming a container body, a second portion adjacent to the first portion for forming a cylindrical finish wall without threads, and a third portion adjacent to the second portion for forming a trim dome or moil. The preform is expanded within the mold cavity to form a one-piece intermediate product that includes a body, a cylindrical wide-mouth finish wall and a moil. After removing the intermediate product from the cavity, the moil is severed from the end of the finish wall. At least one thread is then formed on the finish wall by engaging the finish wall with at least one thread-forming tool, which may be heated to facilitate the forming operation.

25 Claims, 2 Drawing Sheets

U.S. PATENT DOCUMENTS

| | | |
|---|---|---|
| 5,114,659 A | 5/1992 | Krall |
| 5,429,789 A | 7/1995 | Krall |
| 6,068,811 A | 5/2000 | Koda |
| 6,142,186 A | 11/2000 | Donovan |
| 6,228,317 B1 | 5/2001 | Smith |
| 6,237,791 B1 | 5/2001 | Beck et al. |
| 2001/0028902 A1 | 10/2001 | Pascal et al. |

FOREIGN PATENT DOCUMENTS

| | | |
|---|---|---|
| EP | 0392571 A2 | 10/1990 |
| JP | 55-123432 | 9/1980 |
| JP | 5123432 | 9/1980 |
| JP | 60-099639 | 6/1985 |
| JP | 6099639 | 6/1985 |
| JP | 6325018 | 2/1988 |
| JP | 63025018 | 2/1988 |

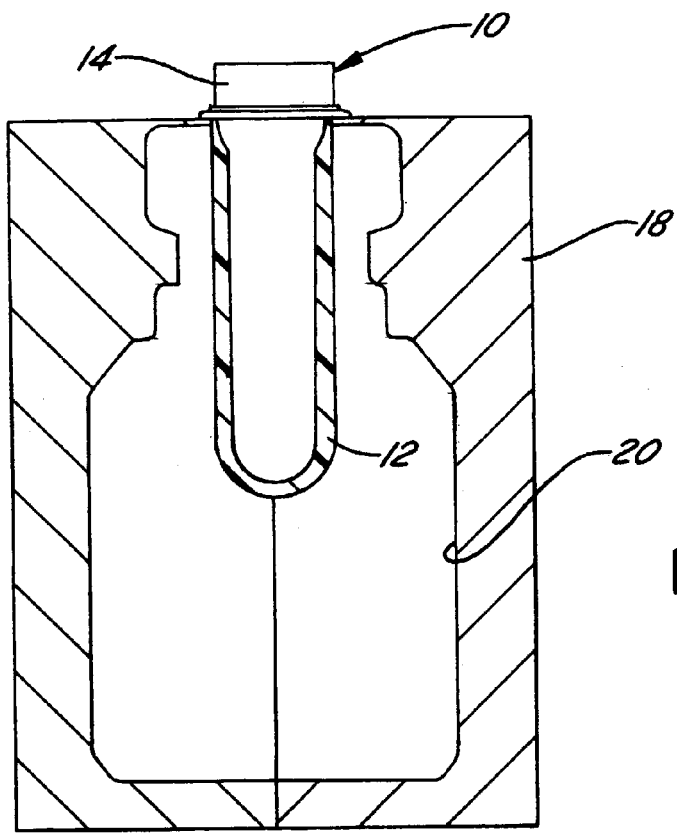
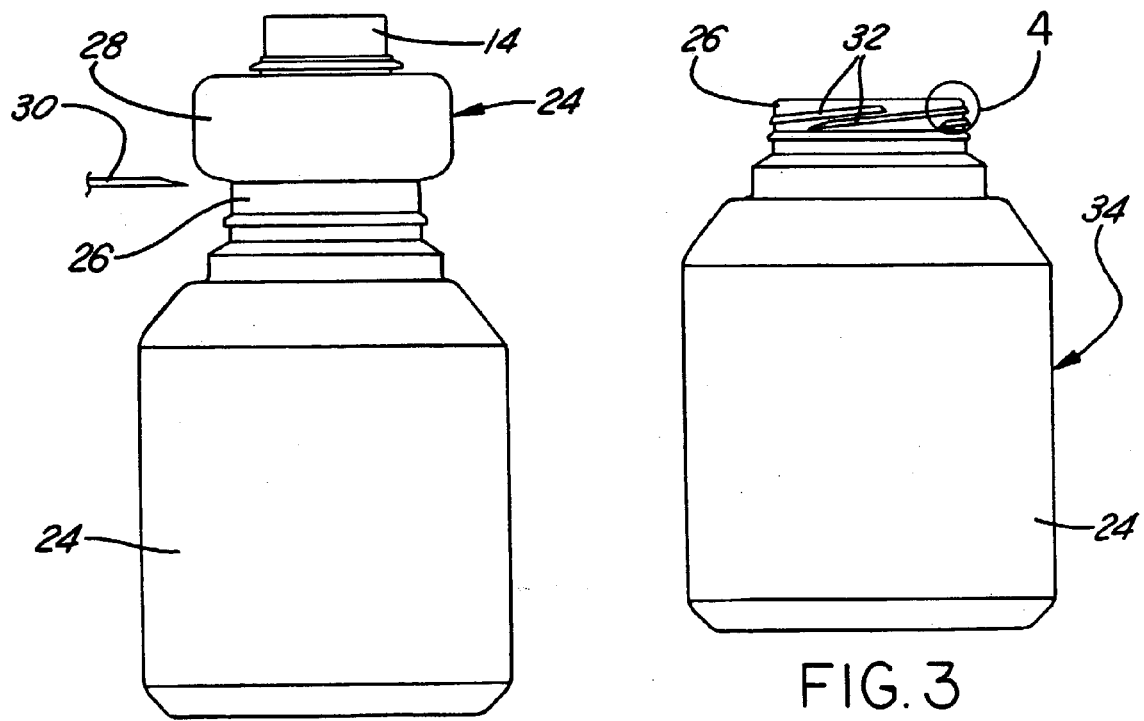

SWAGE-FORMING OF CONTAINER THREADS

The present invention is directed to wide-mouth containers, and more particularly to a method of forming threads on a container finish of polyester construction, particularly PET.

BACKGROUND AND SUMMARY OF THE INVENTION

In the manufacture of plastic containers, such as monolayer or multilayer PET containers, it is conventional to mold a container preform having a body and a finish with one or more external threads. The finish typically is molded to its final geometry in the preform, while the body of the preform is subsequently blow molded to the desired geometry of the container body. Although this manufacturing technique is satisfactory for fabrication of containers with narrow-neck finish diameters, the throughput of the process is greatly reduced when employed for fabricating preforms and containers of larger finish diameters. For example, a preform mold cavity block that has ninety-six mold cavities for preforms with a 28 mm finish diameter would typically accommodate only forty-eight cavities having a 43 mm finish diameter for the same overall cavity block size. This throughput is even further reduced for wide-mouth preforms having a finish diameter greater than about 2.0 inches or 50 mm.

To address this manufacturing throughput problem, it has been proposed to fabricate a wide-mouth container by molding a narrow-neck preform and then blow molding the preform body within a cavity that forms the container body, a container finish with external threads, and a trim dome or moil. The trim moil must be removed from the container body and finish, along with the preform finish, after the container is removed from the blow mold. A problem with this technique is that the external threads on the container finish are blow molded, and are not as sharply defined and detailed as desired. Furthermore, this thread definition problem is exacerbated in the case of containers having at least an external surface of polyester construction, such as PET, because the polyester material can strain harden as it expands during blow molding, making it more difficult to force the finish material into the thread-forming portions of the blow mold. It is therefore a general object of the present invention to provide a method of making a plastic wide-mouth container, and/or a plastic wide-mouth container formed by such method, in which the container threads are formed in a post-molding operation so as to possess improved quality and definition.

In accordance with one aspect of the present invention, a method of making a plastic container having a threaded wide-mouth finish includes providing a preform of molded plastic construction. The preform is placed in a mold cavity having a first portion for forming a container body, a second portion adjacent to the first portion for forming a cylindrical finish wall without threads, and a third portion adjacent to the second portion for forming a trim dome or moil. The preform is expanded within the mold cavity to form a one-piece intermediate container product that includes a body, a cylindrical wide-mouth finish wall without threads, and a trim moil. After removing the intermediate product from the cavity, the moil is severed from the end of the finish wall. At least one internal or external thread is then formed on the finish wall by engaging the finish wall with at least one thread-forming tool. In the preferred method of the invention, the cylindrical finish wall is exteriorly engaged by at least one first tool having at least one groove segment. The cylindrical finish wall is simultaneously interiorly engaged by at least one second tool having at least one rib segment, complimentary to the at least one groove segment, to force portions of the cylindrical finish wall into the groove segment and thereby form at least one internal or external thread. One or both of the first and second tools may be heated to facilitate the forming operation.

A wide-mouth blow molded plastic container in accordance with a second aspect of the present invention includes a hollow body and a cylindrical wide-mouth finish integrally blow molded with the body. The finish has at least one internal or external thread swage-formed in the finish wall after molding. At least the exterior surface portion of the finish wall preferably is of PET construction.

BRIEF DESCRIPTION OF THE DRAWINGS

The invention, together with additional objects, features and advantages thereof, will be best understood from the following description, the appended claims and the accompanying drawings in which:

FIG. 1 is a sectioned schematic drawing that illustrates a plastic preform placed in a blow mold in accordance with one aspect of the present invention;

FIG. 2 illustrates an intermediate container product blow molded in the mold of FIG. 1;

FIG. 3 illustrates an externally threaded wide-mouth container fabricated in accordance with an exemplary but presently preferred implementation of the present invention;

DETAILED DESCRIPTION OF PREFERRED EMBODIMENTS

Figure 6:
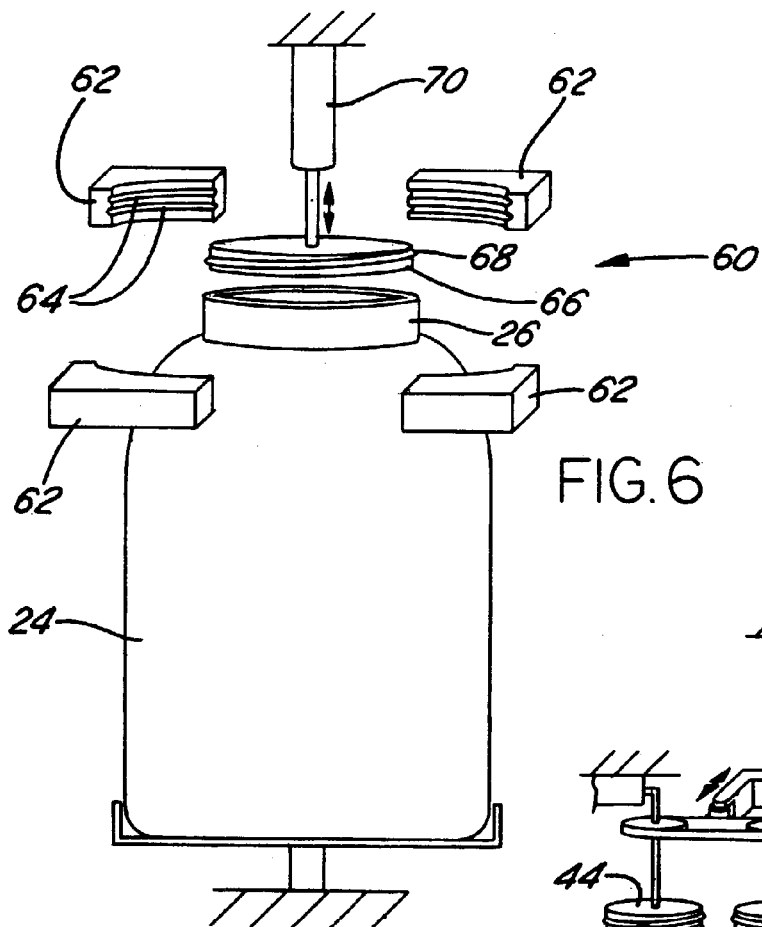
FIG. 6 is a schematic diagram of an alternative apparatus for forming the finish external threads in the container of FIGS. 3 and 4.

The terms "narrow-neck" finish and "wide-mouth" finish are employed in their conventional senses in the present application, in that a "wide-mouth" finish has an outside diameter (E diameter) greater than about 2.0 inches or 50 mm, while a "narrow-neck" finish has an outside diameter equal to or less than about 2.0 inches or 50 mm. A 63 mm finish is a conventional relatively small wide-mouth finish in the plastic container industry, although the present invention is by no means limited to wide-mouth finishes of this particular size. An 83 mm finish is a larger conventional wide-mouth finish size.

FIG. 1 illustrates a preform 10 as comprising a body 12 and an integrally molded upper portion or finish 14. Preform 10 typically is fabricated in an injection molding or compression molding operation. Preform 10 is positioned in a blow mold 18, with preform body 12 being disposed within a cavity 20 formed by mold 18. Application of air under pressure to the interior of preform 10 expands preform body 12 to the confines of mold cavity 20. The resulting intermediate container product 22 is illustrated in FIG. 2 as including a hollow body 24 and an integral cylindrical finish wall 26 without external threads. A trim dome or moil 28 extends upwardly from the upper end of finish wall 26, and terminates in upper portion 14 of preform 10. (It will be appreciated that directional words such as "upper" and "lower" are employed by way of description and not limitation with respect to the upright orientation of the mold, preform, intermediate product and container illustrated in the drawings. Directional words such as "radial" and "circumferential" are employed by way of description and not limitation with respect to the axis of the container finish.)

Figure 4:
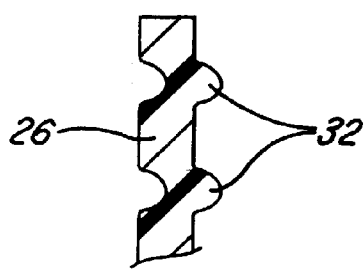
FIG. 4 is a sectional view on an enlarged scale of the portion of FIG. 3 within the area 4.

Trim moil 28 and upper preform portion 14 are severed from finish wall 26 by means of a suitable blade 30 (FIG. 2). One or more external threads 32 are then formed on cylindrical finish wall 26 to provide the wide-mouth container 34 illustrated in FIG. 3. Container 34 includes body 24, finish cylindrical wall 26 integrally extending from body 24, and one or more external threads 32 formed in cylindrical wall 26 after the blow molding operation. Cylindrical finish wall 26 has an external diameter in final container 34 greater than about 2.0 inches or 50 mm—i.e., container 34 is a wide-mouth container. FIG. 4 illustrates threads 32 formed on finish wall 26. There are indentations or channels on the inside surface of finish wall 26 corresponding to the external geometry of threads 32, and finish wall 26 is generally of uniform radial thickness throughout its height and circumference.

Figure 5:
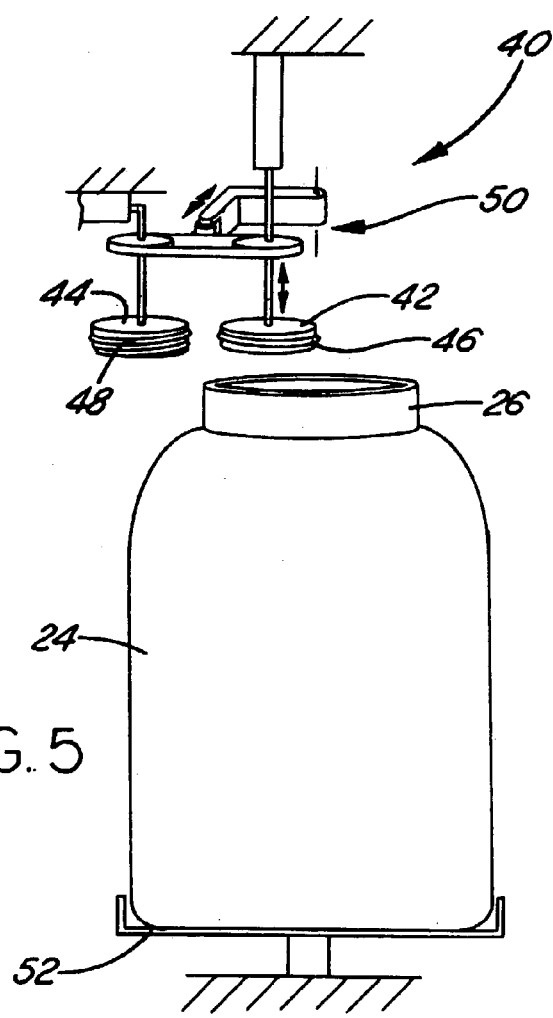
FIG. 5 is a schematic diagram of an apparatus for forming the container finish external threads in the container of FIGS. 3 and 4.

FIGS. 5 and 6 illustrate two exemplary techniques for forming external threads 32 in container finish wall 26 in an after-molding operation. The apparatus 40 of FIG. 5 includes a pair of rollers 42, 44 for disposition inside of and outside of finish wall 26 respectively. Internal roller 42 has one or more external spiral beads or ribs 46, and external roller 44 has one or more internal spiral channels or recesses 48. Tooling generally indicated at 50 brings rollers 42, 44 into opposed engagement with the internal and external surfaces of finish wall 26, and the rollers are rotated with respect to each other to form external threads 32 (FIGS. 3 and 4) on wall 26. These threads are formed by forcing the material of wall 26 radially outwardly into channel 48 on roller 44. Rollers 42, 44 preferably are heated to facilitate this forming operation. As an alternative, rollers 42, 44 may be at room temperature, so that the threads on finish wall 46 are cold formed with the necessary heat being supplied at the molecular level. Tooling 50 may be caused to orbit around a stationary container finish 26, or container body 24 alternatively may be positioned on a rotatable table 52.

FIG. 6 illustrates an alternative exemplary thread forming apparatus 60. External arcuate formers 62 have recessed thread portions or channels 64, and an internal plug 66 has one or more external beads or ribs 68. Plug 66 is positioned by an actuator 70 or the like within finish wall 26, and external formers 62 are moved radially inwardly against the outside surface of wall 26. Formers 62 shrink finish wall 26 onto plug 68 so that external finish threads 32 (FIGS. 3 and 4) are formed in the finish wall. External formers 62 are then expanded radially outwardly and internal plug 70 is withdrawn from the finish, either axially as illustrated in FIG. 6 or by unthreading the plug from the inside of the finish wall. Formers 62 and plug 66 preferably are heated, as in the embodiment of FIG. 5, although cold forming may also be employed.

It is preferred to heat finish wall 26 during the thread forming operation. This heating preferably is carried out by conduction from rollers 42, 44 in FIG. 5, or formers 62 and plug 66 in FIG. 6. The finish wall preferably is heated to a level above room temperature, such as in the range of 50° C. to 100° C. for PET finishes. The temperature of the finish wall should not exceed the glass transition temperature Tg of the finish wall material by more than about 40 to 50° C. For example, finish wall heating to a level of 120° C. or above can cause distortion and warping in a PET finish wall. Five seconds of contact time is ample for thread formation when cylindrical wall 26 has a thickness of 0.5 to 1 mm (0.019 to 0.039 inch). A lesser contact time, such as on the order of one second, is generally not adequate unless the finish wall is very thin, which is not desirable. Thus, one or more external threads are swage formed on the E wall of container finish 26.

As noted above, the present invention finds particular utility in connection with containers in which at least the outer surface portion of the finish wall is of polyester construction, particularly polyethylene terephthalate (PET). This is because radial expansion of finish wall 26 during blow molding can strain harden the PET material, and makes it more difficult to obtain desired thread sharpness and definition during the blow molding operation in the prior art. Preform 12 and container 34 may be of monolayer or multilayer construction. A typical preform 10 may have multiple layers, including internal and external layers of PET construction, and one or more intermediate layers of barrier material such as ethylene vinyl alcohol (EVOH) or polyamide (such as nylon). The intermediate layer or layers are disposed in preform body 12 (FIG. 1), and may or may not extend into preform upper portion 14. It is preferable that the intermediate layer or layers not extend into dome 28 in intermediate product 22, so that the intermediate layer or layers are not exposed at the end of finish wall 26 by severing moil 28 with blade 30. Finish wall 26 may be of PET construction throughout, with the intermediate barrier layer or layers being disposed in container body 24. At least the exterior surface of finish wall 26 may be crystallized before or during formation of threads 32 to prevent shrinkage or distortion. The finish alternatively could be through-crystallized. This would be particularly desirable in hot-fill applications, where the temperature of the material placed in the container might otherwise cause shrinkage or distortion of the container finish. Crystallization of the container finish may extend throughout the radial depth and axial length of the finish, if desired.

There have thus been disclosed a container and method of manufacture that fully satisfy all of the objects and aims previously set forth. The container and method of manufacture have been disclosed in conjunction with several embodiments thereof, and a number of modifications and variations have been discussed. Other modifications and variations will readily suggest themselves to persons of ordinary skill in the art. For example, tooling could be provided on rollers 42, 44, or on external former 62 and plug 66, to swage-form the top sealing surface at the axially upper edge of the finish wall. Trim moil 28 may be of any convenient geometry, and preform finish 14 may be with or without threads as convenient. The invention has been discussed in conjunction with formation of external threads; however, internal threads alternatively can be formed on the container finish employing the same techniques. The invention is intended to embrace all such modifications and variations as fall within the spirit and broad scope of the appended claims.

The invention claimed is:

1. A method of making a plastic container having a threaded wide-mouth finish, which comprises the steps of:
   (a) providing a preform of molded plastic construction,
   (b) placing said preform in a mold cavity having a first portion for forming a container body, a second portion adjacent to said first portion for forming a cylindrical finish wall without threads, and a third portion adjacent to said second portion for forming a trim moil, (c) expanding said preform within said cavity to form a one-piece intermediate product that includes a body, a cylindrical wide-mouth finish wall having a diameter less than that of the body and without threads, and a trim moil, (d) removing said intermediate product from said mold cavity, (e) removing said trim moil, and (f) forming at least one thread on said cylindrical wide-mouth finish wall by engaging said cylindrical finish wall with at least one thread-forming tool.

2. The method set forth in claim 1 wherein said step (f) comprises exteriorly engaging said cylindrical finish wall with at least one first tool having at least one groove segment, and simultaneously interiorly engaging said cylindrical finish wall with at least one second tool having at least one rib segment, complimentary to said at least one groove segment, to force portions of said cylindrical finish wall into said groove segment and thereby form at least one external thread on said finish wall.

3. The method set forth in claim 2 wherein said step (f) includes heating one or both of said first and second tools.

4. The method set forth in claim 2 wherein said step (f) includes rotating one or both of said first and second tools and said intermediate product.

5. The method set forth in claim 2 wherein said step (f) includes exteriorly engaging said cylindrical finish wall with a plurality of said first tools and shrinking said cylindrical finish wall onto said second tool.

6. The method set forth in claim 2 wherein said preform provided in said step (a) has at least an exterior surface of PET construction.

7. The method set forth in claim 6 wherein said finish wall is of PET construction throughout.

8. The method set forth in claim 6 which includes the further step of crystallizing at least an exterior surface of said finish wall prior to or during said step (f).

9. A method of making a plastic container having a threaded wide-mouth finish, comprising the steps of:

(a) placing a preform in a mold cavity and expanding the preform within the cavity to form an intermediate product having a body, a wide-mouth finish wall having a diameter less than that of the body and without threads, and a trim moil;

(b) removing the trim moil; and (c) forming at least one thread on the wide-mouth finish wall by engaging the finish wall with at least one thread-forming tool.

10. The method of claim 9, wherein the mold cavity is a blow mold cavity and the expanding step includes blow molding.

11. The method of claim 9, wherein the at least one thread is formed as an external thread.

12. The method of claim 9, wherein the at least one thread-forming tool includes complimentary groove and rib segments and wherein during the forming steps the rib segment forces a portion of the finish wall into the groove segment to form the at least one thread.

13. The method of claim 9, wherein the at least one thread-forming tool is heated.

14. The method of claim 12, wherein the groove segment is provided on a first tool and the rib segment on a second tool.

15. The method of claim 14, wherein the first and second tools comprise a pair of rollers postionable on the interior and exterior of the finish wall.

16. The method of claim 15, wherein the rollers are heated.

17. The method of claim 9, wherein the forming step comprises cold-forming of the at least one thread.

18. The method of claim 9, wherein the at least one thread-forming tool comprises a plug positionable on the interior of the finish wall and at least one external former, movable radially inwardly against the exterior of the finish wall, to form the at least one thread.

19. The method of claim 18, wherein the at least one external former has a recessed thread portion and the internal plug has an external bead.

20. The method of claim 9, wherein the finish wall is heated during the thread-forming step.

21. The method of claim 9, wherein at least a portion of the finish wall is crystallized before or during formation of the at least one thread.

22. The method of claim 9, including swage-forming a top-sealing surface of the finish wall.

23. The method of claim 9, wherein the preform has at least an exterior surface of PET.

24. The method of claim 9, wherein the finish wall is of PET.

25. The method of claim 9, wherein the forming step comprises swage-forming.

* * * * *